(12) United States Patent
Wann

(10) Patent No.: US 7,136,995 B1
(45) Date of Patent: Nov. 14, 2006

(54) CRYPTOGRAPHIC DEVICE

(75) Inventor: Shuning Wann, Taipei (TW)

(73) Assignee: Enova Technology Corporation, Taipei (TW)

( * ) Notice: Subject to any disclaimer, the term of this patent is extended or adjusted under 35 U.S.C. 154(b) by 1017 days.

(21) Appl. No.: 09/704,769

(22) Filed: Nov. 3, 2000

(51) Int. Cl.
*H04L 9/00* (2006.01)

(52) U.S. Cl. ............... 713/153; 713/190; 713/192; 380/42; 902/2; 705/64; 705/73

(58) Field of Classification Search ............ 380/42; 713/153, 192, 190, 260, 200; 902/2; 705/64, 705/73
See application file for complete search history.

(56) References Cited

U.S. PATENT DOCUMENTS 4,780,905 A * 10/1988 Cruts et al. ............ 380/44
5,513,262 A * 4/1996 van Rumpt et al. ......... 380/29
6,081,895 A * 6/2000 Harrison et al. ........... 713/189

* cited by examiner

*Primary Examiner*—Emmanuel L. Moise
*Assistant Examiner*—Paul Callahan
(74) *Attorney, Agent, or Firm*—The Patel Law Firm, P.C.; Natu J. Patel

(57) ABSTRACT

A cryptographic device comprises a data stream interceptor, a main controller receiving input from the data stream interceptor, and a pair of data generating and storage controllers adapted to perform data transfer protocols with corresponding peer controllers of a data generating device and a data storage device, respectively, on command from the main controller. The cryptographic device further comprises a cipher engine programmed to transparently encrypt and decrypt data streams flowing between the data generating device and data storage device on command from the main controller. The cryptographic device does not utilize system resources associated with the data generating and storage devices during operation.

15 Claims, 4 Drawing Sheets

CRYPTOGRAPHIC DEVICE

FIELD OF THE INVENTION

The present invention relates generally to cryptography and more particularly to a device adapted to perform data encryption/decryption without compromising the overall system performance.

BACKGROUND OF THE INVENTION

Encryption is a security technology designed to preserve the privacy and confidentiality of sensitive data that is being stored or transmitted. Sensitive data is routinely stored unencrypted on desktop computers, workstations, notebooks, personal digital assistants (PDAs), cellular telephones, and the like. The hard drives of notebooks are especially at risk as the computers are frequently used in non-secure environments and may be relatively easily removed by an unauthorized user. Computer hard drives may contain strategic data, patent applications, patent drawings, litigation documents, consumer lists, private health care information, payroll data and other types of sensitive data. Users frequently store unencrypted passwords and access codes to corporate networks on notebooks, which may compromise corporate network security. Statistics compiled annually by the FBI show that network security breaches are to a significant extent being perpetrated by employees or contractors who have or can gain access to sensitive data on an intranet. Moreover, unattended desktop PCs become frequent targets for unauthorized users attempting to gain illicit entry into a private network.

Comparatively few cryptographic applications have been developed to protect data, with most of the applications being software-based applications adapted to perform file-level cryptography. File-level cryptography can also be done by various hardware devices such as PCMCIA cards or external ASIC-based devices. On the surface, encrypting only selected files instead of entire hard drives seems to make sense since not all data is confidential. However, file cryptography is inherently slow because the entire file must be decrypted before any portion of the file can be presented to the user. Also, file encryption normally ignores the temporary and swap files that are automatically created and stored in clear text on the hard drive. Worse still, file encryption frequently results in compromised overall system performance, and requires manual intervention by users who may become confused and frustrated by the number of requisite interactive steps embedded in the application. From an organizational point of view, the lack of automatic and transparent cryptographic operation makes it inherently difficult to enforce data security policies on computers, mobile communication devices and networks alike. Furthermore, the level of security attainable with file-level cryptography is questionable, since file encryption programs run under the control of the computer operating system (OS) and the OS lacks sufficient access control. If an unauthorized user were capable of subverting the OS, subverting the file-level cryptography application would be entirely feasible as well. Although PCMCIA encryption cards and external ASIC encryption devices have been designed to provide greater key security and to improve performance, these devices have had only marginal success and suffer from a variety of compatibility issues. It, therefore, becomes increasingly clear that conventional cryptography applications are not suitable for organizations and/or individuals requiring optimized security, convenience and uncompromised system performance.

SUMMARY OF THE INVENTION

The present invention is generally directed to a cryptographic device adapted to perform data encryption and decryption on at least one data stream flowing between at least one data generating device and at least one data storage device without compromising overall system performance.

In one embodiment of the present invention, the cryptographic device is adapted to intercept at least one data stream flowing between the data generating device and the data storage device, and transparently perform data encryption and decryption in accordance with the intercepted data stream.

In another embodiment of the present invention, the cryptographic device comprises a data stream interceptor, a main controller receiving input from the data stream interceptor, a data generating controller adapted to perform at least one data transfer protocol with the data generating device on command from the main controller, a data storage controller adapted to perform at least one data transfer protocol with the data storage device on command from the main controller, and a cipher engine adapted to transparently encrypt and decrypt data streams flowing between the data generating device and the data storage device on command from the main controller.

Another preferred embodiment is to place, between the Main Control and the Signal Transmission Line, an Interceptive Device for intercepting data to be encrypted or decrypted according to the Main Control instructions.

Yet another preferred embodiment is to introduce two Data Buffers, one of which is provided between the data encryption-decryption device and the data storage device, and the other buffer provided between the data encryption-decryption device and the data-generating device, for storing pre-decrypted and encrypted data and pre-encrypted and decrypted data, respectively.

These and other aspects of the present invention will become apparent from a review of the accompanying drawings and the following detailed description of the present invention.

BRIEF DESCRIPTION OF THE DRAWINGS

The invention is best understood from the following detailed description when read in conjunction with the accompanying drawings. It is emphasized that, according to common practice, the various features of the drawings are not to scale with dimensions of the various features being arbitrarily expanded or reduced for clarity. Like numerals denote like features throughout the specification and drawings in which.

DETAILED DESCRIPTION OF THE PREFERRED EMBODIMENT

Some embodiments of the present invention are described in detail with reference to the related drawings of FIGS. 1–4. Additional embodiments, features and/or advantages of the invention will become apparent from the ensuing description or may be learned by practicing the invention.

Figure 1:
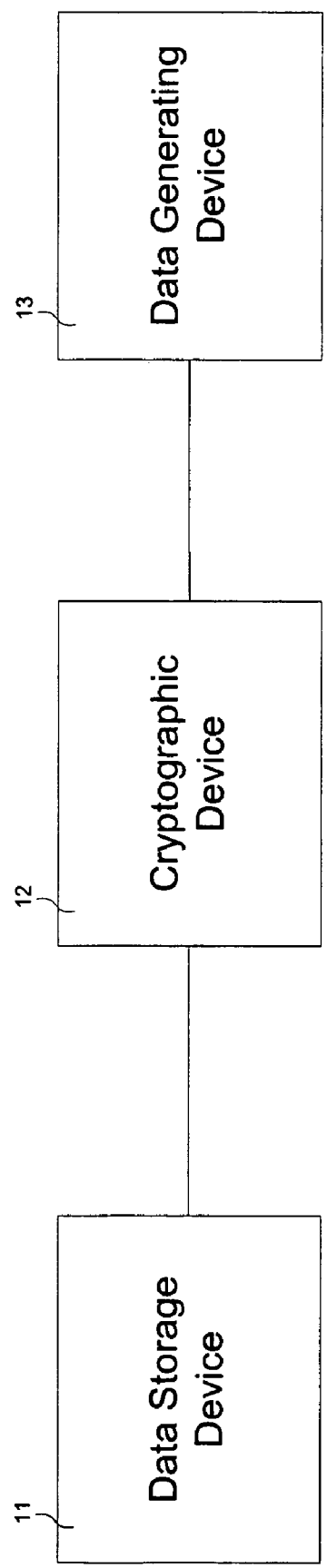
FIG. 1 schematically depicts a cryptographic device operatively coupled between a data generating device and a data storage device for use during data transfer.

FIG. 1 schematically depicts a cryptographic device 12 operatively coupled between a data generating device 13 and a data storage device 11 for use during data transfer. In general, data generating device 13 may be a desktop/notebook computer, microprocessor, hub, router, mobile computing device, interface card, or any other device capable of generating data, while data storage device 11 may be a computer hard drive, tape drive, floppy diskette, compact disk drive, magnetic optical drive, digital video recorder, flash memory card, magnetic tape, compact disk (CD), CD-RW, CD+RW, CD-R, digital versatile disk, PCMCIA card, or any other device capable of storing data for retrieval purposes. Cryptographic device 12 is adapted to perform data encryption/decryption during data transfers between data generating device 13 and data storage device 11 without compromising the overall system performance. Specifically, cryptographic device 12 does not utilize resources typically associated with data generating device 13, such as CPU, DRAM, or other system resources during data transfers between data generating device 13 and data storage device 11. From the functional viewpoint of data generating device 13 and/or data storage device 11, data transfers are being performed directly between data generating device 13 and/or data storage device 11, respectively, without any intervention by cryptographic device 12. In general, cryptographic device 12 acts as an "invisible" data transfer bridge connecting data generating device 13 and data storage device 11. Cryptographic device 12 may be implemented in any suitable stand-alone hardware form such as a hub or the like. Cryptographic device 12 may also be implemented as a designated data transfer interface adapted to use various data communication protocols in network applications such as local area networks (LANs), wide area networks (WANs), and the like.

Figure 2:
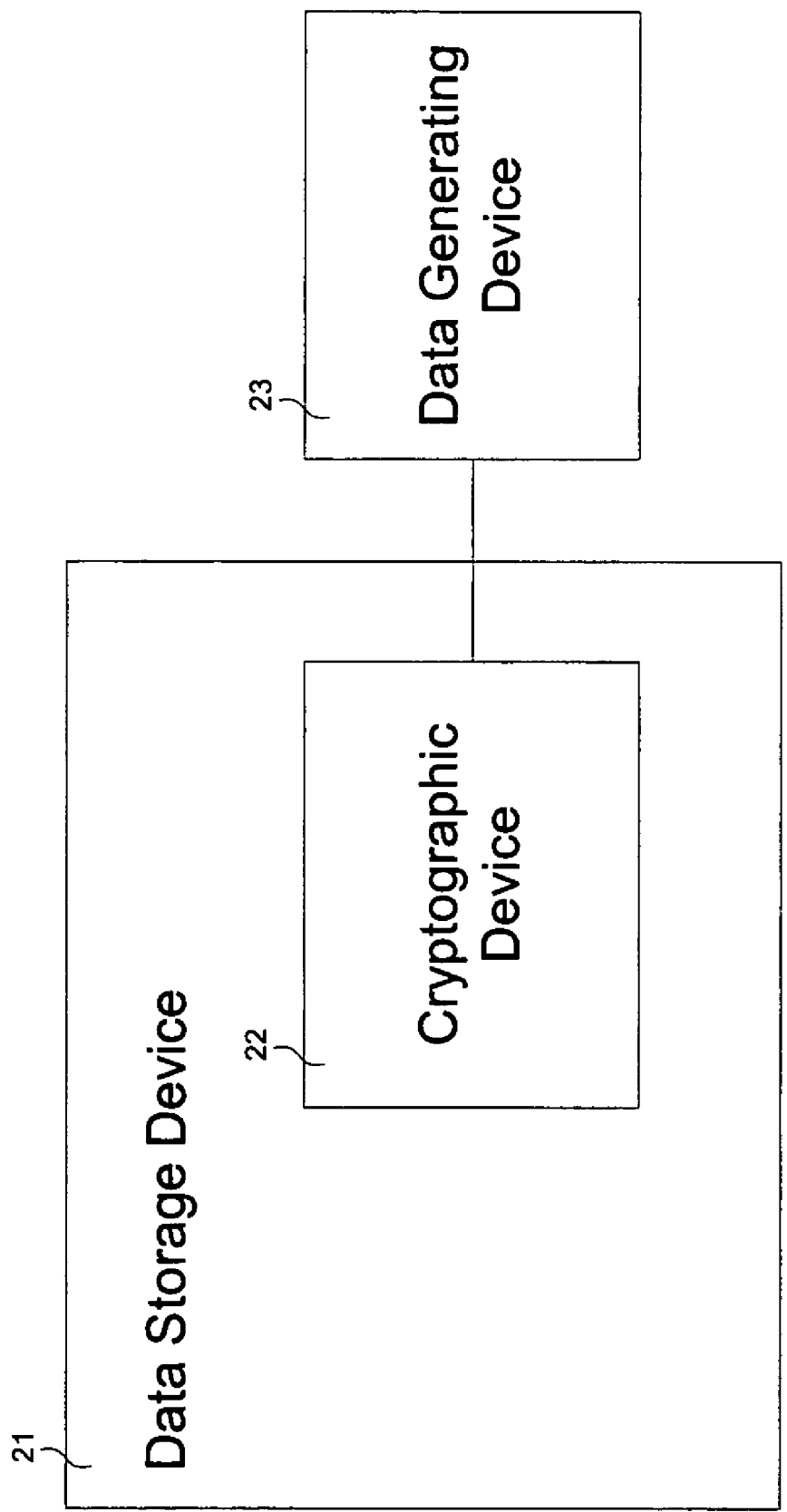
FIG. 2 schematically depicts a data storage device with an integral cryptographic device operatively coupled to a data generating device for use during data transfer.

FIG. 2 schematically depicts a data storage device 21 with an integral cryptographic device 22 being operatively coupled to a data generating device 23 for use during data transfer. Cryptographic device 22 may be integrated in ASIC chip form on the front end of the data transfer interface (not shown) of data storage device 21 without any modification of dataflow control hardware, drivers or data storage device 21 itself. The data transfer interface may be in the form of Socket, IDE, PCI, 1394, SCSI, PCMCIA, USB or any other suitable data transfer interface. In general, data generating device 23 may be a desktop/notebook computer, microprocessor, hub, router, mobile computing device, interface card, or any other device capable of generating data. Data storage device 21 may be a computer hard drive, tape drive, floppy diskette, compact disk drive, magnetic optical drive, digital video recorder, flash memory card, magnetic tape, compact disk (CD), CD-RW, CD+RW, CD-R, digital versatile disk, PCMCIA card, or any other device capable of storing data for retrieval purposes. Cryptographic device 22 is programmed to perform transparently data encryption/decryption during data transfers between data generating device 23 and data storage device 21 without compromising the overall system performance. From the functional viewpoint of data generating device 23, data transfer is being performed directly with data storage device 21 without any apparent intervention by integral cryptographic device 22.

Figure 3:
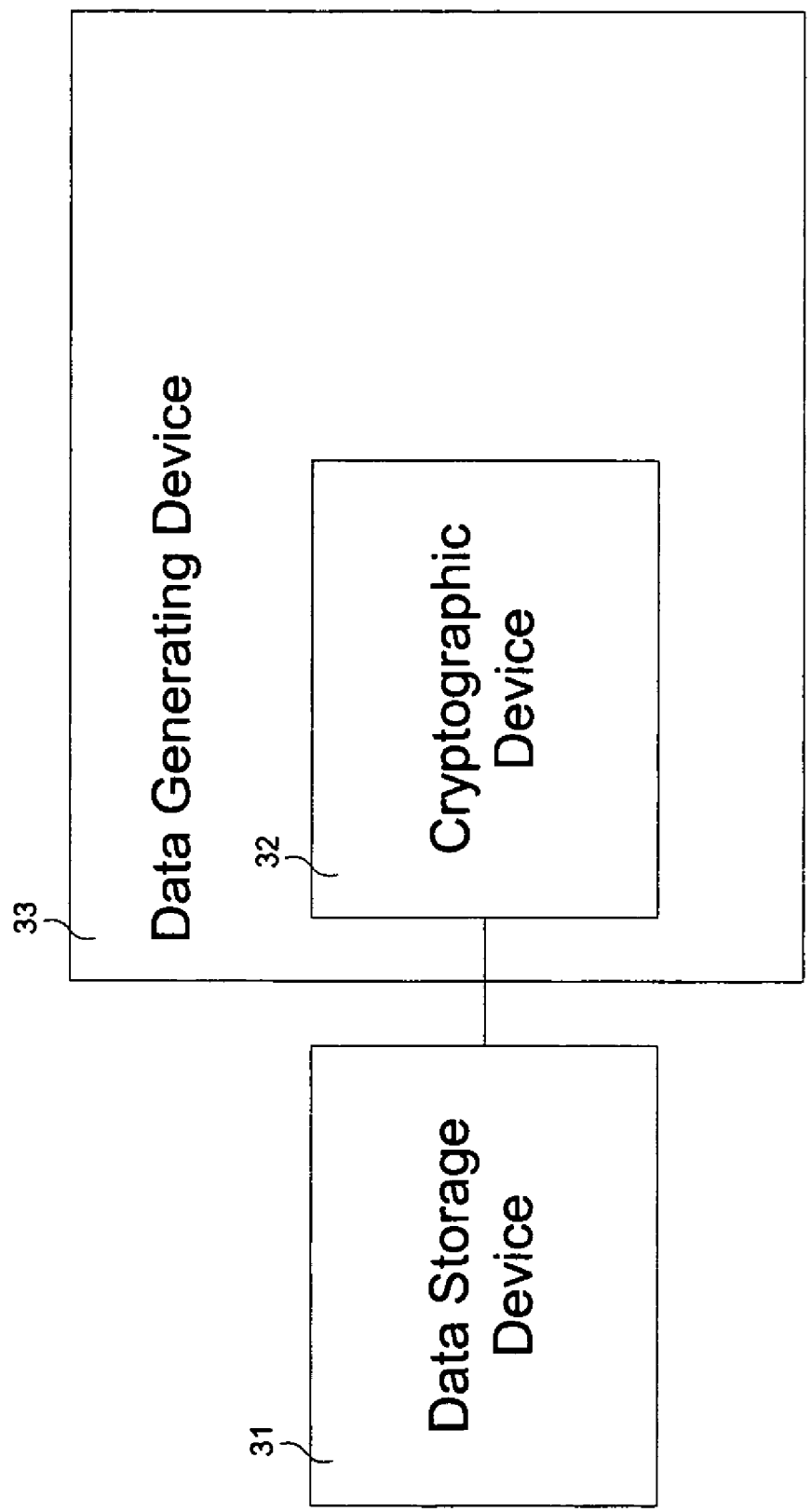
FIG. 3 schematically depicts a data generating device with an integral cryptographic device operatively coupled to a data storage device for use during data transfer.

FIG. 3 schematically depicts a data generating device 33 with an integral cryptographic device 32 being operatively coupled to a data storage device 31 for use during data transfer. Cryptographic device 32 may be integrated in ASIC chip form on the front end of the data transfer interface (not shown) of data generating device 33 without any modification to dataflow control hardware, drivers or data generating device 33 itself. The data transfer interface may be in the form of Socket, IDE, PCI, 1394, SCSI, PCMCIA, USB or any other suitable data transfer interface. In general, data generating device 33 may be a desktop/notebook computer, microprocessor, hub, router, mobile computing device, interface card, or any other device capable of generating data. Data storage device 31 may be a computer hard drive, tape drive, floppy diskette, compact disk drive, magnetic optical drive, digital video recorder, flash memory card, magnetic tape, compact disk (CD), CD-RW, CD+RW, CD-R, digital versatile disk, PCMCIA card, or any other device capable of storing data for retrieval purposes. Cryptographic device 32 is programmed to perform transparently data encryption/decryption during data transfers between data generating device 33 and data storage device 31 without compromising the overall system performance. From the functional viewpoint of data storage device 31, data transfer is being performed directly with data generating device 33 without any apparent intervention by integral cryptographic device 32.

Figure 4:
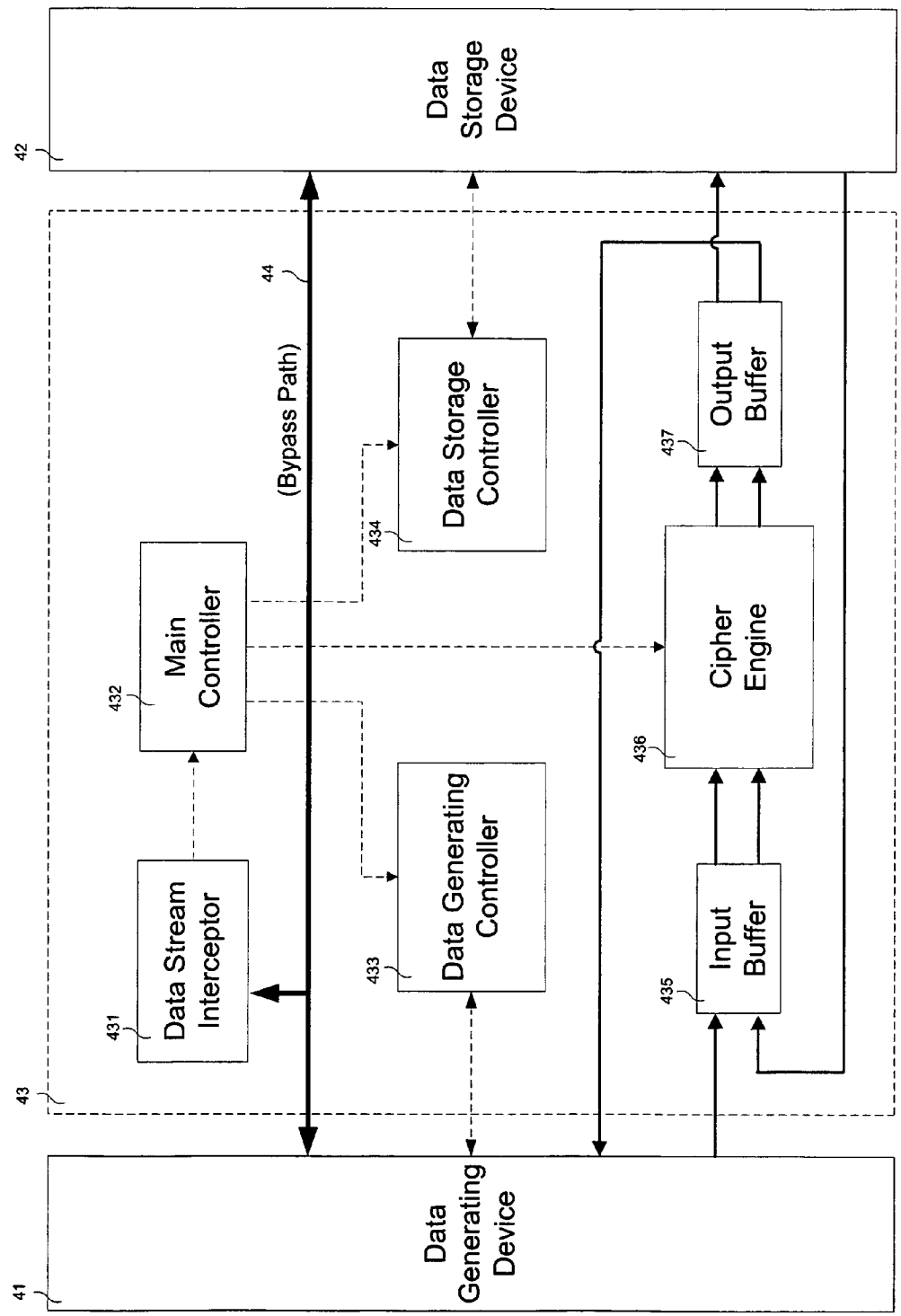
FIG. 4 schematically depicts the architecture of a cryptographic device in accordance with the present invention.

FIG. 4 depicts schematically the architecture of a cryptographic device 43 in accordance with the present invention. In the embodiment of FIG. 4, cryptographic device 43 is shown operatively coupled between a data generating device 41 and a data storage device 42 for use during data transfer. In general, data generating device 41 may be a desktop/notebook computer, microprocessor, hub, router, mobile computing device, interface card, or any other device capable of generating data. Data storage device 42 may be a computer hard drive, tape drive, floppy diskette, compact disk drive, magnetic optical drive, digital video recorder, flash memory card, magnetic tape, compact disk (CD), CD-RW, CD+RW, CD-R, digital versatile disk, PCMCIA card, or any other device capable of storing data for retrieval purposes. Cryptographic device 43 may be implemented in any suitable hardware form. Cryptographic device 43 is adapted to perform transparently data encryption and decryption during data transfers between data generating device 41 and data storage device 42 with no impact on overall system performance.

As generally illustrated in FIG. 4, cryptographic device 43 comprises a data stream interceptor 431 which is operatively coupled to a main controller 432. Main controller 432 communicates control signals to a data generating controller 433, a data storage controller 434, and a cipher engine 436. Main controller 432 receives input from data stream interceptor 431 and determines whether an incoming data stream, which may include command/control and/or data signals, is to be encrypted, decrypted or passed through unmodified. In this regard, data stream interceptor 431 is adapted to distinguish between command/control and data signal transfers. Specifically, interceptor 431 is configured to pass through certain command/control signals via a bypass data path 44, and intercept other command/control signals which are transmitted to main controller 432, as generally depicted in FIG. 4. Main controller 432 instructs data generating controller 433 and data storage controller 434 to perform specific data transfer protocols such as read/write, PIO/

DMA, ATA/IDE, PCI, and the like with corresponding peer controllers (not shown) of data generating device 41 and data storage device 42, respectively, according to the intercepted command/control signals. Main controller 432 also transmits control signals to cipher engine 436 to notify the same of an incoming data stream. Cipher engine 436 is operatively coupled between an input buffer 435 and an output buffer 437, and programmed to transparently encrypt/decrypt streaming data during data transfer between data generating device 41 and data storage device 42, as generally shown in FIG. 4. Input buffer 435 stores pre-encrypted and pre-decrypted data, while output buffer 437 stores encrypted and decrypted data, respectively. Input buffer 435 receives data from data generating device 41 or data storage device 42 depending on the type of data transfer. Output buffer 437 outputs data to data generating device 41 or data storage device 42 depending on the type of data transfer. Data generating device 41 may include a 1-bit, 8-bit, 16-bit or 32-bit data width interface. Data storage device 42 may include a 1-bit, 8-bit, 16-bit or 32-bit data width interface. Cipher engine 436 may include a 64-bit, 128-bit or other data width interface depending on the ciphering algorithm being used. Input buffer 435 is adapted to convert incoming data width to a data width suitable for input to cipher engine 436. Output buffer 437 is adapted to convert incoming data width to a data width suitable for output to data storage device 42 or data generating device 41.

No resources associated with data generating device 41 or data storage device 42, or any other system resources, are being used by cryptographic device 43 during data transfer between data generating device 41 and data storage device 42. Cryptographic device 43 independently and transparently encrypts/decrypts incoming data streams without compromising the overall system performance. A person skilled in the art would recognize that cryptographic device 43 may be adapted for implementation in network communication applications such as those involving LANs, WANs, virtual private networks (VPNs), and the Internet.

While the invention has been described in terms of various specific embodiments, those skilled in the art would recognize that the invention can be practiced with modification within the spirit and scope of the claims. Additionally, features illustrated or described as part of one embodiment can be used in another embodiment to provide yet another embodiment such that the features are not limited to the specific embodiments described hereinabove. Thus, it is intended that the present invention cover all such embodiments and variations as long as such embodiments and variations come within the scope of the appended claims and their equivalents.

What is claimed is:

1. A cryptographic device, compromising:
   at least one data stream interceptor that distinguishes between command/control and data signal transfers;
   a main controller receiving input from said at least one data stream interceptor and determining whether incoming data would be encrypted or passed through based on the received input from said at least one data stream interceptor;
   at least one data generating controller adapted to perform at least one data transfer protocol with at least one data generating device on command from said main controller;
   at least one data storage controller adapted to perform at least one data transfer protocol with at least one data storage device on command from said main controller; and
   at least one cipher engine adapted to transparently encrypt at least one data stream between said at least one data generating device and said at least one data storage device on command from said main controller.

2. The cryptographic device of claim 1, wherein said at least one cipher engine is operatively coupled between at least one input buffer and at least one output buffer.

3. The cryptographic device of claim 2, wherein said at least one input buffer receives data from said at least one data generating device and said at least one data storage device.

4. The cryptographic device of claim 2, wherein said at least one output buffer outputs data to said at least one data generating device and said at least one data storage device.

5. A cryptographic device, comprising:
   at least one data stream interceptor that distinguishes between command/control and data signal transfers;
   a main controller receiving input from said at least one data stream interceptor and determining whether incoming data would be decrypted or passed through based on the received input from said at least one data stream interceptor;
   at least one data generating controller adapted to perform at least one data transfer protocol with at least one data generating device on command from said main controller;
   at least one data storage controller adapted to perform at least one data transfer protocol with at least one data storage device on command from said main controller; and
   at least one cipher engine adapted to transparently decrypt at least one data stream between said at least one data generating device and said at least one data storage device on command from said main controller.

6. The cryptographic device of claim 5, wherein said at least one cipher engine is operatively coupled between at least one input buffer and at least one output buffer.

7. The cryptographic device of claim 6, wherein said at least one input buffer receives data input from said at least one data generating device and said at least one data storage device.

8. The cryptographic device of claim 6, wherein said at least one output buffer outputs data to said at least one data generating device and said at least one data storage device.

9. A cryptographic device, comprising:
   at least one data stream interceptor that distinguishes between command/control and data signal transfers;
   a main controller receiving input from said at least one data stream interceptor and determining whether incoming data would be encrypted, decrypted or passed through based on the received input from said at least one data stream interceptor;
   at least one data generating controller adapted to perform at least one data transfer protocol with at least one data generating device on command from said main controller;
   at least on data storage controller adapted to perform at least one data transfer protocol with at least one data storage device on command from said main controller; and
   at least one cipher engine adapted to transparently encrypt or decrypt at least one data stream between said at least one data generating device and said at least one data storage device on command from said main controller.

10. The cryptographic device of claim 9, wherein said at least one cipher engine is operatively coupled between at least one input buffer and at least one output buffer.

11. The cryptographic device of claim 10, wherein said at least one input buffer receives data from said at least one data generating device and said at least one data storage device.

12. The cryptographic device of claim 10, wherein said at least one output buffer outputs data to said at least one data generating device and said at least one data storage device.

13. A cryptographic device operatively coupled between a data generating device and a data storage device for use during data transfer, said cryptographic device comprising:
  a data steam interceptor that distinguishes between command/control and data signal transfers;
  a main controller receiving input from said at least one data stream interceptor and determining whether incoming data would be encrypted, decrypted or passed through based on the received input from said at least one data stream interceptor;
  a data generating controller adapted to perform at least one data transfer protocol with the data generating device on command from said main controller;
  a data storage controller adapted to perform at least one data transfer protocol with the data storage device on command from said main controller; and
  a cipher engine adapted to transparently encrypt or decrypt at least one data stream between the data generating device and the data storage device on command from said main controller.

14. A cryptographic device integrated within a data storage device for use during data transfer with a data generating device, said cryptographic device comprising:
  a data stream interceptor that distinguishes between command/control and data signal transfers;
  a main controller receiving input from said data stream interceptor and determining whether incoming data would be encrypted, decrypted or passed through based on the received input from said at least one data stream interceptor;
  a data generating controller adapted to perform at least one data transfer protocol with the data generating device on command from said main controller;
  a data storage controller adapted to perform at least one data transfer protocol with the data storage device on command from said main controller; and
  a cipher engine adapted to transparently encrypt or decrypt at least one data stream between the data generating device and the data storage device on command from said main controller.

15. A cryptographic device integrated within a data generating device for use during data transfer with a data storage device, said cryptographic device comprising:
  a data stream interceptor that distinguishes between command/control and data signal transfers;
  a main controller receiving input from said data stream interceptor and determining whether incoming data would be encrypted, decrypted or passed through based on the received input from said at least one data stream interceptor;
  a data generating controller adapted to perform at least one data transfer protocol with the data generating device on command from said main controller;
  a data storage controller adapted to perform at least one data transfer protocol with the data storage device on command from said main controller; and
  a cipher engine adapted to transparently encrypt or decrypt at least one data stream between the data generating device and the data storage device on command from said main controller.

* * * * *

UNITED STATES PATENT AND TRADEMARK OFFICE
CERTIFICATE OF CORRECTION

| | | |
|---|---|---|
| PATENT NO. | : 7,136,995 B1 | Page 1 of 1 |
| APPLICATION NO. | : 09/704769 | |
| DATED | : November 14, 2006 | |
| INVENTOR(S) | : Shuning Wann | |

It is certified that error appears in the above-identified patent and that said Letters Patent is hereby corrected as shown below:

Column 5, line 52, claim 1 "compromising" should read --comprising--.

Column 6, line 57, claim 9 "on" should read --one--.

Signed and Sealed this

Twenty-third Day of February, 2010

David J. Kappos
*Director of the United States Patent and Trademark Office*